Jan. 17, 1967   M. L. THOMPSON   3,298,337
VALVE DAMPING ASSEMBLY
Filed Nov. 17, 1964
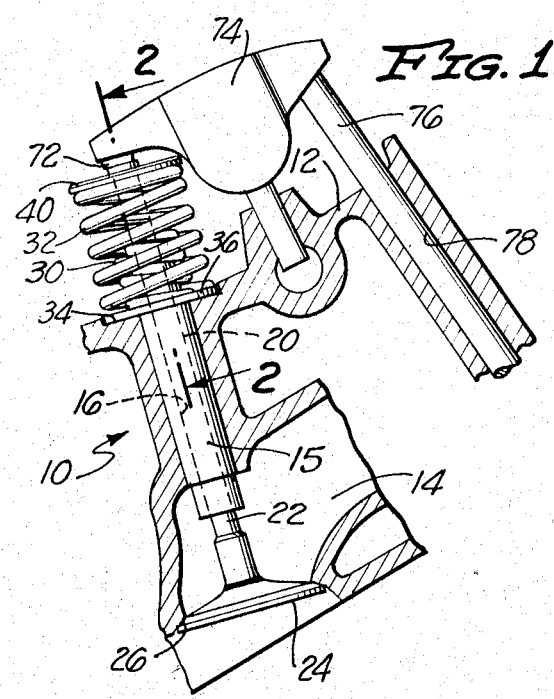
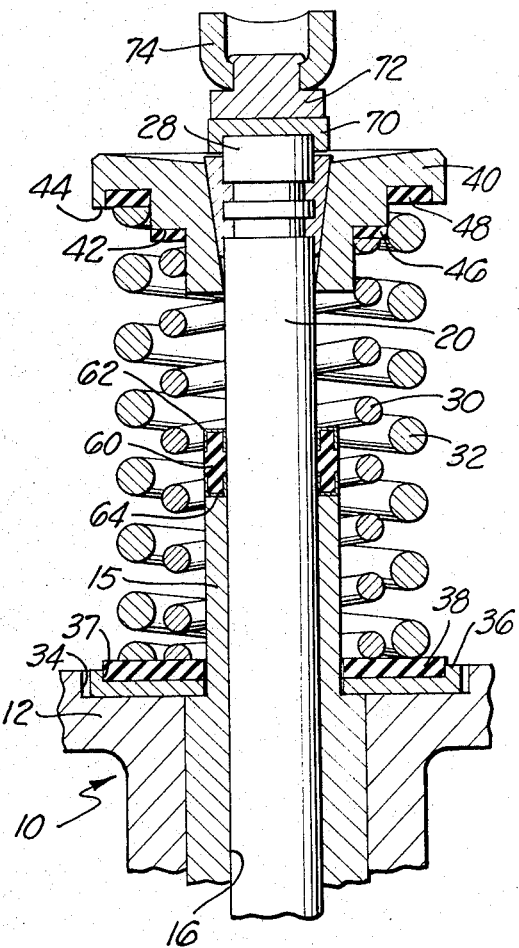
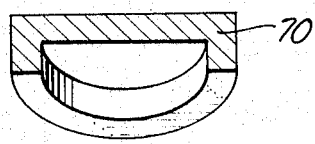
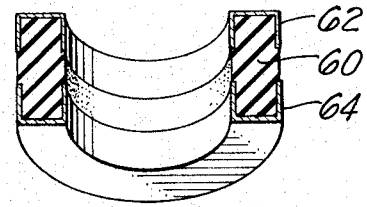
INVENTOR.
MARION LEE THOMPSON
BY
MAHONEY, HALBERT &
HORNBAKER
ATTORNEYS

United States Patent Office 3,298,337
Patented Jan. 17, 1967

3,298,337
VALVE DAMPING ASSEMBLY
Marion Lee Thompson, 2734 Eastvale,
Rolling Hills, Calif. 90274
Filed Nov. 17, 1964, Ser. No. 411,918
4 Claims. (Cl. 123—188)

This invention relates to a valve damping assembly and, more particularly, to a valve damping assembly for an internal combustion engine in which there are combined means for cushioning the valve compression springs so as to extend the useful life of the valve assembly and so as to reduce or eliminate harmonics in the valve assembly, and means for damping the valve stroke so as to prevent valve movement beyond full cam position during opening stroke.

In valve assemblies in general use, normally two compression springs are provided, one circumferentially surrounding the other. These springs are seated at their lower ends on the engine head housing, and at their upper ends on a spring retainer or cap ring mounted on the valve stem closely adjacent the free upper end of the stem. With the constant compression of the springs on every opening stroke of the valve, substantial frictional forces are applied to both the cap ring and to the engine head, and additionally, and especially at high-speed engine operation, substantial harmonics are created in the springs so that the operation of the engine is often excessively noisy.

It is, therefore, an object of the present invention to provide simplified means for cushioning the compression springs so that frictional wear on the cap ring and on the housing will be substantially reduced or eliminated, and so that harmonics will be dampened.

Furthermore, generally the valve assembly of an engine is so constructed that on the opening stroke the valve head, after obtaining full open position, nevertheless proceeds beyond this position, without thereby accomplishing any useful function, and it is a further object of the invention to provide readily installable means for limiting the travel of the opening stroke so that excessive travel of the valve beyond full open position is prevented, and a still further object to provide such means which are resilient so that the damping of the stroke is smooth and will not cause excessive wear on the valve assembly.

It is still another object of the invention to provide such cushioning means, damping means, and reinforcing means which may be readily mounted on existing valve assemblies without requiring substantial structural changes in the assemblies.

It is yet another object of the invention to provide such means which may be manufactured inexpensively and easily installed with a minimum of effort.

With these and other objects in view, the invention consists of the construction, arrangement and combination of the various elements of the device, whereby the objects contemplated are attained, as hereinafter set forth, pointed out in the appended claims, and illustrated in the accompanying drawing, in which:

FIG. 1 is a side elevational view, partly in section, showing the combination of the present invention installed on an engine;

FIG. 2 is an enlarged view taken on line 2—2 of FIG. 1;

FIG. 3 is an enlarged view of the wear plate element of the invention, partly in perspective and partly in section;

FIG. 4 is an enlarged view of the resilient valve damper element of the invention, partly in perspective and partly in section; and FIG. 5 is an enlarged view of a modified form of the upper cushion ring element of the invention in cross section.

Referring particularly to FIG. 1 of the drawing, an engine housing 10 has a head 12 having a port 14 and an upwardly protruding cylindrical valve guide 15 (best shown in FIG. 2). A through bore 16 is formed in the guide 15, the bore 16 passing through the head 12 into the port 14.

A valve stem 20 is disposed for reciprocable movement within the bore 16. Mounted on one end 22 of the stem 20 and disposed in the port 14 is a valve face 24. When the valve is closed, the valve face 24 is seated on a valve seat 26, and on an opening stroke the valve face 24 moves off the seat 26 to full cam. The other end 28 of the stem 20 extends through the bore 16 and protrudes beyond the guide 15.

Circumferentially surrounding the protruding end 28 of the stem 20 and the guide 15 is a first helical compression spring 30, and circumferentially surrounding said first spring 30 is a second helical compression spring 32, best illustrated in FIG. 2.

An arcuate groove 34 is formed in the engine head 12, said groove 34 surrounding the guide 15, and disposed in the groove 34 is a first ring 36, preferably of hard, heat resistant material. The ring 36 in turn has an arcuate groove 37 formed therein, and inserted in the groove 37 is a second ring 38, the ring 38 being disposed in the groove 37 so as to protrude therefrom and form a seat for the springs 30 and 32. The ring 38 is made of a resilient, sound-deadening material.

Mounted on the stem 20 adjacent to but spaced apart from the end 28 thereof is an arcuate cap ring or valve spring retainer 40. The lower surface of the retainer 40 is stepped, the lower step 42 being aligned with the spring 30, and the upper step 44 being aligned with the spring 32. The steps 42 and 44 are arcuately grooved, and inserted in the groove in the step 42 is an arcuate, flat insert 46 of resilient, sound-deadening material disposed so as to form a seat for the spring 30, while inserted in the groove in the step 44 is an arcuate, flat insert 48, also of resilient, sound-deadening material, the insert 48 being disposed so as to form a seat for the spring 32.

In the modified form of the invention shown in FIG. 5, in lieu of the flat inserts 46 and 48, O-rings 50 and 52 are inserted in the grooves in the steps 42 and 44, respectively, the O-rings 50 and 52 protruding from their respective grooves.

An annular collar 60 of resilient material is slidably disposed on the stem 20 externally of the guide 15. Preferably the collar 60 is capped top and bottom by metal caps 62 and 64, and caps 62 and 64 being spaced apart from each other. The purpose of the caps 62 and 64 is to render the ends of the collar 60 resistant to wear, while still permitting the collar 60 to maintain its resilient characteristic. The collar 60 is best shown in FIGS. 2 and 4 of the drawing.

A hard metallic cylindrical wear plate or cap 70 is mounted on the free end 28 of the stem 20 so as to abut on an anvil 72 which is mounted adjacent one end of the undersurface of a rocker arm 74. The rocker arm 74 is pivotally mounted on the engine head 12 by means well known in the art. The other end of the undersurface of the rocker arm 74 is in abutment with a reciprocal push rod 76 slidably disposed in a through bore 78 in the engine head 12.

During the opening stroke of the valve, the springs 30 and 32 will, of course, be compressed. Frictional wear at the points of abutment of the springs 30 and 32 on the engine head 12 and on the cap ring 40 will be resisted or eliminated by the resiliency of the ring 38 and the inserts 46 and 48 (or alternately by the O-rings 50 and 52) respectively.

When the opening stroke has brought the valve face 24 to full-open cam position, the resilient collar 60 will be seated on the guide 15 and the cap ring 40 will be seated on the resilient collar 60 so that, without jarring shock, the opening stroke movement of the valve will be arrested, and the closing stroke of the valve will commence.

On both strokes harmonics will be drastically reduced or eliminated by reason of the fact that all bearing points are resilient and sound-deadening.

In view of the further fact that the cap 70 is constructed of much harder material than is the stem 20 and presents a substantially larger bearing surface to the anvil 72, frictional wear at this point will be greatly reduced and the danger of "hang-up" between the stem 20 and the anvil 72, with consequent distortion damage to the stem 20, will be eliminated.

Although the invention has been herein shown and described in what is conceived to be the most practical and preferred embodiment thereof, it is recognized that departures may be made therefrom within the scope of the invention, which is not to be limited to the details disclosed herein, but is to be accorded the full scope of the claims so as to embrace any and all equivalent structures and devices.

I claim:

1. In an internal combustion engine which includes a valve with a valve stem; an engine head having means defining a valve stem guide which reciprocably receives said valve stem; means engageable with said valve stem and operable to move said valve from a closed position to a predetermined open position; valve spring retaining means mounted on the valve stem; compression spring means interposed between the engine head and the valve spring retaining means for biasing the valve toward its closed position, the improvement of a valve damping assembly which comprises:
    first seat means disposed on the engine head and made of thin, resilient material for cushioning the abutment thereon of said compression spring means without appreciably affecting the magnitude and character of said biasing; and
    second seat means disposed on said valve spring retaining means and made of thin, resilient material for cushioning the abutment thereon of said compression spring means without appreciably affecting the magnitude and character of said biasing.

2. A valve damping assembly according to claim 1 and including resilient means disposed on the valve stem and interposed between the engine head and the valve spring retaining means for damping movement of the valve at its open position, said resilient means being of such length that it is engaged by the engine head and the valve spring retaining means when the valve reaches its open position.

3. A valve damping assembly according to claim 2 wherein said resilient means is a collar slidably disposed on the valve stem.

4. In an internal combustion engine which includes a valve with a valve stem; an engine head having means defining a valve stem guide which reciprocably receives said valve stem; means engageable with said valve stem and operable to move said valve from a closed position to a predetermined open position; valve spring retaining means mounted on the valve stem; compression spring means interposed between the engine head and the valve spring retaining means for biasing the valve toward its closed position, the improvement of a valve damping assembly which comprises:
    resilient means disposed on the valve stem and interposed between the engine head and the valve spring retaining means for damping movement of the valve at its open position, said resilient means being of such length that it is engaged by the engine head and the valve spring retaining means when the valve reaches its open position.

References Cited by the Examiner

UNITED STATES PATENTS

| | | | |
|---|---|---|---|
| 933,698 | 9/1909 | Crook | 123—188 |
| 2,051,313 | 8/1936 | Olenick | 123—90 |
| 2,117,433 | 5/1938 | Krebs | 123—188 |
| 2,191,333 | 2/1940 | Willgoos | 123—188 |
| 2,698,012 | 12/1954 | Smith et al. | 123—188 |
| 2,776,652 | 1/1957 | Crotty | 123—188 |
| 3,160,406 | 12/1964 | Dickinson | 267—8 |
| 3,206,184 | 9/1965 | Walker | 267—8 |

MARK NEWMAN, *Primary Examiner.*

AL LAWRENCE SMITH, *Examiner.*